(12) United States Patent
Schwab et al.

(10) Patent No.: US 8,404,352 B2
(45) Date of Patent: Mar. 26, 2013

(54) POLYOLEFIN-METAL LAMINATE

(75) Inventors: Thomas J. Schwab, Loveland, OH (US); Steven A. Schwartz, Downingtown, PA (US); Maged G. Botros, West Chester, OH (US); Charles S. Holland, Springboro, OH (US); Robert S. Weber, Liberty Township, OH (US); Richard T. E. Sylvester, Liberty Township, OH (US); Neil W. Morris, Maineville, OH (US)

(73) Assignee: Equistar Chemicals, LP, Houston, TX (US)

( * ) Notice: Subject to any disclaimer, the term of this patent is extended or adjusted under 35 U.S.C. 154(b) by 872 days.

(21) Appl. No.: 12/288,471

(22) Filed: Oct. 21, 2008

(65) Prior Publication Data

US 2010/0098958 A1    Apr. 22, 2010

(51) Int. Cl.
  *A23L 1/22* (2006.01)
  *B32B 27/00* (2006.01)
(52) U.S. Cl. .................................. 428/476.9; 427/535
(58) Field of Classification Search .................. 428/461, 428/476.9; 427/535
  See application file for complete search history.

(56) References Cited

U.S. PATENT DOCUMENTS

| | | | |
|---|---|---|---|
| 3,856,889 A | 12/1974 | McConnell | |
| 4,087,587 A | 5/1978 | Shida et al. | |
| 4,224,379 A * | 9/1980 | Ichinose et al. | 428/461 |
| 4,232,086 A * | 11/1980 | Mori et al. | 428/341 |
| 4,313,996 A * | 2/1982 | Newman et al. | 428/215 |
| 4,350,740 A * | 9/1982 | Coran et al. | 428/461 |
| 4,366,184 A | 12/1982 | Auerbach et al. | |
| 4,397,916 A * | 8/1983 | Nagano | 428/461 |
| 4,416,944 A | 11/1983 | Adur | |
| 4,452,942 A | 6/1984 | Shida et al. | |
| 4,460,745 A | 7/1984 | Adur et al. | |
| 4,888,237 A | 12/1989 | Balloni et al. | |
| 4,897,305 A | 1/1990 | Ho | |
| 5,312,529 A * | 5/1994 | Antonelli et al. | 204/486 |
| 5,346,963 A | 9/1994 | Hughes et al. | |
| 5,367,022 A | 11/1994 | Kiang et al. | |
| 5,866,172 A | 2/1999 | Parks | |
| 6,458,235 B1 | 10/2002 | Beentjes et al. | |
| 6,723,431 B2 | 4/2004 | Mallory et al. | |
| 7,267,883 B2 | 9/2007 | Fujihara et al. | |

FOREIGN PATENT DOCUMENTS

JP    11106947    4/1999

OTHER PUBLICATIONS

Wolf, "Unique Atmospheric Plasma Surface Pre-Treatment Approach for Improving Adhesion", Annual Technical Conference—Society of Plastics Engineers (2006), $64^{th}$ at p. 418.

Markgraf, "Atmospheric Plasma—The New Functional Treatment for Extrusion Coating and Lamination Processes", Enercon Industries Inc. at TAPPI $9^{th}$ European Place Conference 2003—Rome.

* cited by examiner

*Primary Examiner* — Kevin R Kruer

(57) ABSTRACT

A laminate and a process for making it are disclosed. The laminate comprises a metal substrate and a polymer layer that adheres to at least one plasma-treated surface of the metal substrate. The polymer layer comprises a blend of a first polyolefin and a grafted polyolefin. The laminate can be prepared by plasma-treating at least one surface of a metal substrate and extruding onto the plasma-treated surface a polymer layer comprising a blend of a first polyolefin and a grafted polyolefin.

14 Claims, No Drawings

POLYOLEFIN-METAL LAMINATE

FIELD OF THE INVENTION

The invention relates to polyolefin-metal laminates that exhibit high interlayer adhesion. The polymer layer includes a grafted polyolefin.

BACKGROUND OF THE INVENTION

Laminates of metals with polymers are known. Examples include pipes coated with a polymer to decrease corrosion while maintaining the mechanical properties of the metal, food packaging that combines the shelf life of the metal with the sealing properties of the polymer, and fasteners such as coated nails or screws with improved corrosion resistance. Adhesion between the polymer and the metal is often an issue and there have been several attempts to improve interlayer adhesion. For example, U.S. Pat. No. 7,267,883 prepares a laminate of a metal with a polyimide film. To improve adhesion, they use a specific polyimide formulation, plasma treat the polyimide, and then use chemical vapor deposition of the metal. U.S. Pat. No. 4,888,237 discloses flame treatment of polypropylene prior to metallization to improve the interlayer adhesion.

U.S. Pat. No. 6,723,431 teaches multilayer films, including one made from polypropylene blended with maleic anhydride-grafted polypropylene. The polypropylene surface is corona-treated and then extrusion coated with ethylene-vinyl alcohol (EVOH) copolymer. The EVOH skin comprises the surface for aluminum deposition. This is an intricate, multi-step process.

Blends of polyolefin with a grafted polyolefin are known. U.S. Pat. No. 4,087,587 teaches blends of polyethylene with a grafted polyolefin. The grafted polyolefin is polyethylene that has been reacted with an unsaturated fused ring carboxylic acid anhydride. The blends adhere well to a variety of substrates, including metals. Another blend of polyolefin with grafted polyolefin is disclosed in U.S. Pat. No. 4,416,944. The blend is used to make polymer-metal composites such as aluminum/polymer blend/copper "sandwiches." For other examples of grafted polyolefin blends, see U.S. Pat. Nos. 3,856,889, 4,460,745, 4,452,942, and 5,367,022. While these blends give improved adhesion versus polyolefin without grafted polyolefin, the adhesion is not sufficient for some applications.

Polymer surfaces are sometimes treated with plasma to promote adhesion. For example, Annual Technical Conference-Society of Plastics Engineers (2006), 64$^{th}$ at page 418 discloses that plasma treatment of polypropylene improves its adhesion to UV-curable inks. A presentation by Enercon Industries Inc. at TAPPI 9$^{th}$ European Place Conference 2003—Rome, Italy entitled "Atmospheric Plasma—The New Functional Treatment for Extrusion Coating and Lamination Processes" discloses that LDPE treated with plasma exhibits improved adhesion with acetate-film acrylic-adhesive tape. In another example, U.S. Pat. No. 4,897,305 discloses plasma treatment of polypropylene with aliphatic hydrocarbon vapors to improve its adhesion to metals.

Plasma treatment of metal surfaces to improve adhesion to polymers appears to be known but is rarely reported. U.S. Pat. No. 4,366,184, for instance, teaches to improve adhesion of a silicone elastomer to a metal substrate by plasma treating the metal substrate in the presence of an organosilicon compound. In another example, published Japanese application 11-106947 teaches treatment of metal surfaces with low-temperature plasma to impart peel-resistance to an overcoating on the metal.

Despite earlier progress, the need remains for metal-polymer laminates with high interlayer adhesion. Poor interlayer adhesion renders a laminate unsuitable for many applications. A simple way to make laminates with high interlayer adhesion would be valuable.

SUMMARY OF THE INVENTION

In one aspect, the invention is a polyolefin-metal laminate. The laminate comprises a metal substrate and a polymer layer that adheres to at least one plasma-treated surface of the metal substrate. The polymer layer is a blend of a polyolefin and a grafted polyolefin. In another aspect, the invention is a process for making the polyolefin-metal laminate. The process comprises plasma-treating at least one metal surface of the metal substrate and extruding onto the plasma-treated surface a polymer layer comprising a blend of first polyolefin and a grafted polyolefin.

DETAILED DESCRIPTION OF THE INVENTION

In one aspect, the invention is a laminate that preferably exhibits high interlayer adhesion. The laminate comprises a metal substrate that has at least one plasma-treated surface and a polymer layer that adheres to the plasma-treated surface.

Any kind or shape of metal substrate can be used. Preferably, the substrate is a metal article, sheet, or film. Preferably, metal film is used because this can be readily extrusion coated. The metal is preferably aluminum, nickel, copper, iron, or alloys thereof. More preferably, the metal is aluminum.

Plasma results from electrical ionization of a gas. The plasma (glow) discharge creates a cloud of ionized gas in which a certain proportion of the electrons are free. Plasma treatment of a metal surface can be performed with a variety of gases and can be done in vacuum or under atmospheric pressure. Preferably, atmospheric plasma treatment is used. Atmospheric-pressure plasma can be generated by means of high-voltage discharge. The generated plasma can be directed to at least one surface of the metal to be treated. Preferably, the plasma is generated in a gas comprising greater than 70% by volume of a noble gas such as helium, neon, and argon. More preferably, the plasma is generated in greater than 70% by volume argon.

In addition to the metal substrate, the laminate comprises a polymer layer that adheres to at least one plasma-treated surface of the metal substrate. By "adheres," we mean that the polymer layer bonds to the plasma-treated metal surface and resists delamination or peeling. Preferably, the interlayer adhesion is greater than 1.20 pounds per inch, more preferably greater than 1.25 pounds per inch, and most preferably greater than 1.30 pounds per inch, when measured by a T-peel test according to ASTM D-1876.

The polymer layer is a blend comprising a first polyolefin and a grafted polyolefin. Preferably, the first polyolefin is an ethylene or propylene homopolymer or copolymer. The first polyolefin can be made by any process including gas-phase, solution, slurry, or high-pressure radical processes. Preferably, the first polyolefin is polypropylene, HDPE, MDPE, LDPE, LLDPE, or blends thereof. More preferably, the first polyolefin is LDPE.

The polymer layer also includes a grafted polyolefin. By "grafted polyolefin," we mean a composition comprising a polyolefin, at least a portion of which has been reacted with an unsaturated carboxylic acid or an unsaturated carboxylic acid derivative. The composition may include, in addition to the grafted material, a "let down" resin (see, e.g., U.S. Pat. No. 5,346,963, the teachings of which are incorporated herein by reference), which can be any grafted or ungrafted polyolefin resin used to dilute or otherwise modify the characteristics of the grafted polyolefin. Preferably, when a let down resin is included, it is an ungrafted resin similar or identical to the resin used to make the grafted material.

Suitable carboxylic acids and carboxylic acid derivatives used for making the grafted polyolefin include acrylic acid, methacrylic acid, maleic acid, itaconic acid, butyl acrylate, dihexyl maleate, maleic anhydride, nadic anhydride, and himic anhydride. Maleic anhydride is preferred.

The grafted polyolefin is conveniently prepared by combining a polyolefin with an unsaturated carboxylic acid or an unsaturated carboxylic acid derivative, optionally in the presence of a free-radical initiator (e.g., benzoyl peroxide), and extruding the molten reaction product according to well-known methods. The amount of unsaturated carboxylic acid or unsaturated carboxylic acid derivative used can be varied. Preferably, the grafted polyolefin (including any let down resin) incorporates from 0.1 to 5 wt. %, more preferably from 0.2 to 2 wt. %, of the unsaturated carboxylic acid or derivative.

The grafted polyolefin can be prepared from any polyolefin. Preferably, the grafted polyolefin is prepared from polypropylene, HDPE, MDPE, LDPE, LLDPE, or blends thereof. More preferably, the grafted polyolefin is prepared from polyethylene. Preferably, the grafted polyolefin is polyethylene grafted with maleic anhydride. For more examples of grafted polyolefins and how to make and use them, see U.S. Pat. Nos. 3,856,889, 4,460,745, 4,452,942, and 5,367,022, the teachings of which are incorporated herein by reference.

The blend of the first polyolefin and the grafted polyolefin can be prepared by any means. One convenient method is to combine the polyolefin with the grafted polyolefin and then extrude the mixture. Preferably, the blend contains from 0.5 to 20% by weight, more preferably from 1 to 10% by weight, of the grafted polyolefin.

The invention includes a process for making a polyolefin-metal laminate, preferably one that exhibits high interlayer adhesion. The process comprises: (a) plasma-treating at least one surface of a metal substrate; and (b) extruding onto the plasma-treated surface a polymer layer comprising a blend of a first polyolefin and a grafted polyolefin.

It is known to treat polyolefin with ozone to improve adhesion. For examples of the use of ozone, see U.S. Pat. Nos. 5,866,172 and 6,458,235. Preferably, the blend is melted in an extruder and exposed to ozone gas prior to forming the laminate.

Preferably, the laminate is prepared by extrusion coating. One valuable process comprises plasma-treating at least one surface of a metal substrate and extruding onto the plasma-treated surface a polymer layer comprising a blend of a polyolefin and a grafted polyolefin. The blend is processed in an extruder, and as it exits the extruder die, the polymer melt is placed on the plasma-treated surface of the metal substrate. Preferably, the process is continuous. Preferably, a roll of metal film is used. As the roll of metal is unwound, it is exposed to plasma and then a film of molten blend is extruded onto the metal surface. Preferably, the laminate is passed through a chilled nip roll that cools the polymer blend and presses the blend onto the metal substrate. Preferably, the polymer blend melt is exposed to ozone gas via a treater bar at the opening of the extruder die.

As used herein, "melt index" means $MI_2$ or low-load melt index as measured according to ASTM D-1238, Condition E. Density is measured according to ASTM D-1505. Adhesion is measured in pounds per inch according to a T-peel test, ASTM D-1876.

The following examples merely illustrate the invention. Those skilled in the art will recognize many variations that are within the spirit of the invention and scope of the claims.

EXAMPLE 1

Petrothene® NA 204000 (LDPE having a melt index=7 g/10 min; density =0.918 g/cm$^3$; available from Equistar Chemicals, LP) and Plexar® PX3198 (melt index=2.7 g/10 min; density=0.933 g/cm$^3$; modified polyethylene incorporating about 0.7 wt. % maleic anhydride, also available from Equistar), are combined to produce a blend comprising 3 wt. % of the grafted polyolefin. Aluminum foil is extrusion coated with the blend at a coat rate of 15 pounds per ream and a line speed of 600 feet per minute. Prior to coating, the aluminum foil is exposed to a plasma containing 20% by volume oxygen and 80% by volume argon. The plasma is generated using a Plasma3™ system available from Enercon Industries Corporation. The blend melt curtain is exposed to ozone gas via a treater bar at the opening of the die. Adhesion of the laminate (T-peel test, ASTM D-1876) is 1.25 lb/in.

EXAMPLE 2

A laminate is prepared as in Example 1 using a plasma of 100% argon. The adhesion is 1.33 lb/in.

EXAMPLE 3

A laminate is prepared as in Example 1 using a blend containing 7% by weight of the grafted polyolefin. The adhesion is 1.37 lb/in.

EXAMPLE 4

A laminate is prepared as in Example 2 using a blend containing 7% by weight of the grafted polyolefin. The adhesion is 1.49 lb/in.

COMPARATIVE EXAMPLE 5

A laminate is prepared as in Example 1 using LDPE alone and without the use of plasma or ozone. The adhesion is 0.95 lb/in. This adhesion is inferior to that of Examples 1-4, demonstrating that LDPE alone has poor adhesion to aluminum.

COMPARATIVE EXAMPLE 6

A laminate is prepared as in Comparative Example 5, but with ozone treatment of the LDPE. The adhesion is 0.98 lb/in. This demonstrates that ozone-treated LDPE has poor adhesion to aluminum.

COMPARATIVE EXAMPLES 7-14

Other combinations are used to prepare laminates. The conditions and adhesion results are shown in Table 1. The comparative examples demonstrate that both the use of a blend of a polyolefin (e.g., LDPE) with a grafted polyolefin and plasma treatment of the metal substrate are required to give good adhesion. When the grafted polyolefin is not used, the adhesion results are inferior (cf. Comparative Examples 5-10). When the metal substrate is not treated with plasma, the adhesion results are inferior even if the grafted polyolefin is present (cf. Comparative Examples 11-14).

TABLE 1

Polyolefin-Metal Laminates

| Example | Polymer Layer | Plasma | Ozone | Adhesion (lb/in.) |
|---|---|---|---|---|
| 1 | LDPE with 3% PX3198 | 20% $O_2$/ 80% Ar | Yes | 1.25 |
| 2 | LDPE with 3% PX3198 | Ar | Yes | 1.33 |
| 3 | LDPE with 7% PX3198 | 20% $O_2$/ 80% Ar | Yes | 1.37 |
| 4 | LDPE with 7% PX3198 | Ar | Yes | 1.49 |
| C5 | LDPE | None | None | 0.95 |
| C6 | LDPE | None | Yes | 0.98 |
| C7 | LDPE | 20% $O_2$/ 80% Ar | None | 0.90 |
| C8 | LDPE | 20% $O_2$/ 80% Ar | Yes | 1.12 |
| C9 | LDPE | Ar | Yes | 1.11 |
| C10 | LDPE | Ar | None | 1.03 |
| C11 | LDPE with 3% PX3198 | None | None | 1.03 |
| C12 | LDPE with 3% PX3198 | None | Yes | 1.20 |
| C13 | LDPE with 7% PX3198 | None | None | 1.14 |
| C14 | LDPE with 7% PX3198 | None | Yes | 1.17 |

The preceding examples are meant only as illustrations. The following claims define the invention.

We claim:

1. A polyolefin-metal laminate comprising a metal substrate and a polymer layer that adheres to at least one plasma-treated surface of the metal substrate, wherein the polymer layer comprises a blend of a first polyolefin and a grafted polyolefin.

2. The laminate of claim 1 wherein the substrate comprises a metal selected from the group consisting of aluminum, nickel, copper, iron, and alloys thereof.

3. The laminate of claim 2 wherein the metal is aluminum.

4. The laminate of claim 1 wherein the plasma is generated in a gas comprising greater than 70% by volume of a noble gas selected from the group consisting of helium, neon, and argon.

5. The laminate of claim 1 prepared by extrusion coating wherein the blend is melted in an extruder and exposed to ozone gas prior to contacting the polymer layer with the plasma-treated surface of the metal substrate.

6. The laminate of claim 1 having an interlayer adhesion greater than 1.20 pounds per inch when measured according to ASTM D-1876.

7. The laminate of claim 6 wherein the interlayer adhesion is greater than 1.30 pounds per inch.

8. The laminate of claim 7 wherein the first polyolefin is LDPE.

9. The laminate of claim 1 wherein the first polyolefin is polyethylene.

10. The laminate of claim 1 wherein the grafted polyolefin comprises LLDPE grafted with maleic anhydride.

11. The laminate of claim 1 wherein the blend comprises from 0.5 to 20 wt. % of the grafted polyolefin.

12. The laminate of claim 11 wherein the blend comprises from 1 to 10 wt. % of the grafted polyolefin.

13. The laminate of claim 1 wherein the grafted polyolefin incorporates from 0.1 to 5 wt. % of an unsaturated carboxylic acid or an unsaturated carboxylic acid derivative.

14. A process for making a polyolefin-metal laminate, said process comprising: (a) plasma-treating at least one surface of a metal substrate; and (b) extruding onto the plasma-treated surface a polymer layer comprising a blend of a first polyolefin and a grafted polyolefin.

* * * * *